No. 834,030. PATENTED OCT. 23, 1906.
W. H. SUTTON.
MARKING ATTACHMENT FOR PLOWS.
APPLICATION FILED NOV. 18, 1905.
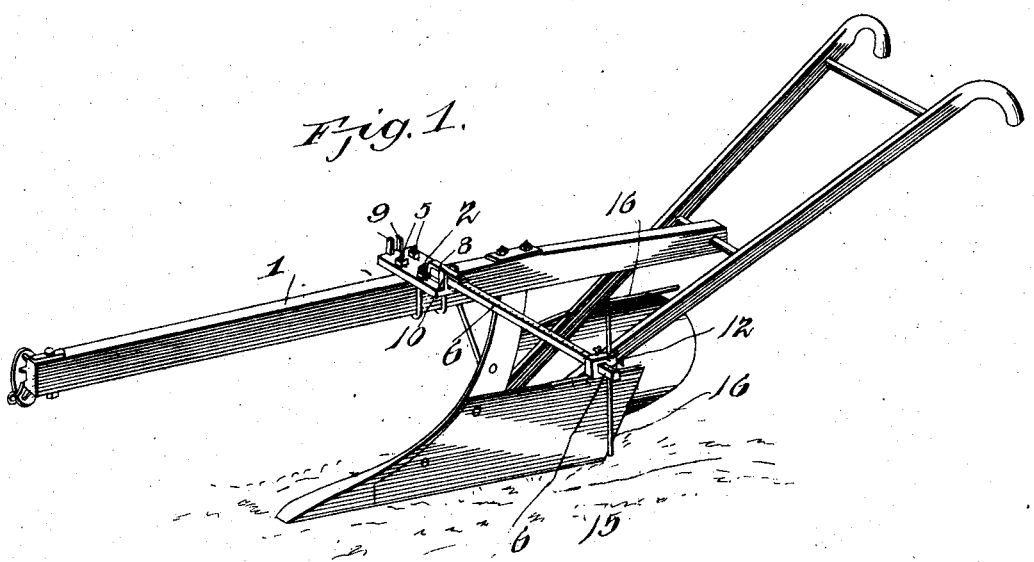
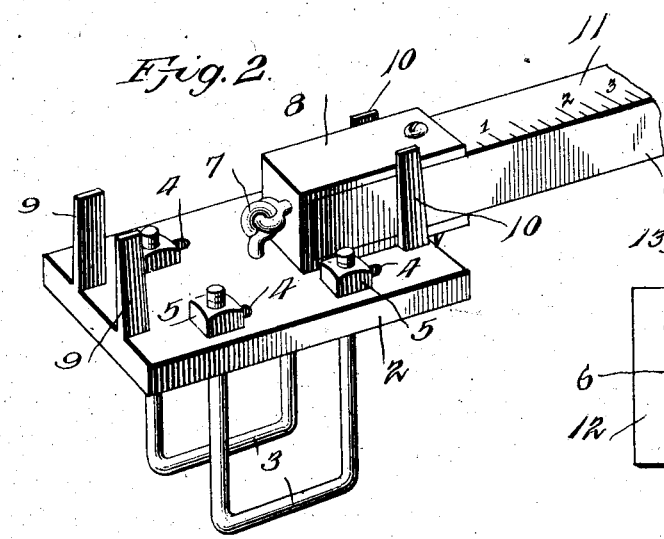
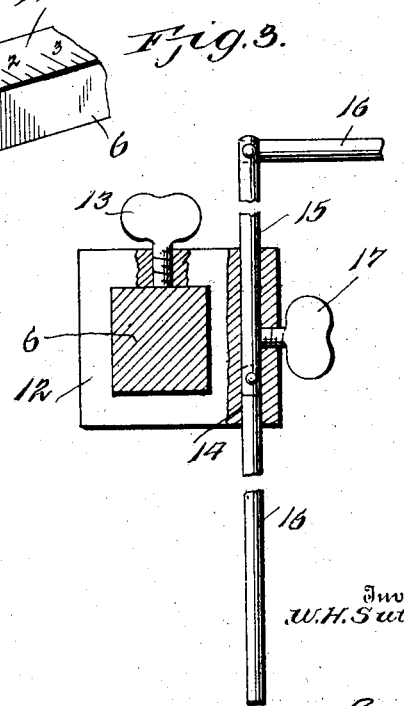
Witnesses
Frank Hough
C. C. Hines
Inventor
W. H. Sutton
By Victor J. Evans
Attorney

UNITED STATES PATENT OFFICE.

WILLIAM HENRY SUTTON, OF KINSTON, NORTH CAROLINA.

MARKING ATTACHMENT FOR PLOWS.

No. 834,030.  Specification of Letters Patent.  Patented Oct. 23, 1906.

Application filed November 18, 1905. Serial No. 287,999.

*To all whom it may concern:*

Be it known that I, WILLIAM HENRY SUTTON, a citizen of the United States of America, residing at Kinston, in the county of Lenoir and State of North Carolina, have invented new and useful Improvements in Marking Attachments for Plows, of which the following is a specification.

This invention relates to marking attachments for plows, the object of the invention being to provide a simple and effective marking device which may be thrown over to operate upon either side of the plow for accurately gaging and marking off the distance between rows.

The preferred embodiment of the invention is illustrated in the accompanying drawings, in which—

Figure 1 is a perspective view showing the application of the invention to a plow. Fig. 2 is a perspective view of the supporting-bracket and pivoted end of the marker-carrying and gage bar. Fig. 3 is a sectional view through the gage bar and slide.

Referring now more particularly to the drawings, the numeral 1 designates the beam of a plow, upon which is supported a bracket-plate 2, said plate being arranged to rest upon the upper surface of the beam and extending transversely thereof and secured thereto by U-shaped bolts or clips 3. These bolts or clips embrace the beam and have their threaded terminals projecting upward through slots 4, formed in the plate, and fitted with clamping-nuts 5, the slots 4 being of sufficient length to enable the plate to be adjusted to project equally beyond the sides of the beam. A bar 6 is pivotally connected at one end, as indicated at 7, to the center of the bracket-plate, so as to be swung over the beam to project laterally at either side thereof, the pivotal connection preferably being made through the medium of screw eyes or bolts, the screw eye or bolt upon the bar being carried by or passing through a U-shaped wear-plate 8, protecting the pivoted end of the bar. The bar is adapted when swung in opposite directions to fit between opposite sets or pairs of stay-lugs 9 and 10, extending upwardly from the bracket-plate, and to thereby be effectually stayed and supported in operative position. The inner faces of the stay-lugs are preferably flared or diverged in an upward direction, so as to enable the bar to be readily guided between them and to fit with sufficient friction to prevent its upward displacement under ordinary strain.

One of the faces of the bar 6 is provided with a gage 11, laid off in feet and inches, and carried by the bar is a marker-holder 12, slidably mounted on the bar, so that it may be adjusted to support the marking device at any desired distance from the beam, which may be accurately determined by adjusting the holder to register with a desired gage-mark. The holder 12 is adapted to be fixed in adjusted position upon the bar by a set-screw 13 and is provided with a vertical passage 14, receiving the supporting stem or member 15 of a marking device, which stem carries at its ends pivoted marking-fingers 16, the lower ends of which are adapted to form a line upon the surface of the ground at a desired distance from the shovel of the plow. The supporting-stem 15 is fixed in adjusted position by a set-screw 17, carried by the slide-block 12, and may be inserted or removed upon slackening the set-screws by adjusting the fingers 16 to lie in the plane of the stem and sliding the marker as a whole in one direction or the other through the passage 14, as will be readily understood. The pivoted fingers 16 are adapted to ride over clods and other obstructions without injury and are adapted to swing by gravity to operative position when the bar 6 is swung to either side of the plow. The marking device is movable endwise in the passage 14, so that the jointed ends of the fingers may be drawn into the passage to lock the acting finger against pivotal movement. One or the other of the fingers will be in position for operation when the bar is swung to one side or the other of this beam, while the inactive finger will swing to a horizontal position, so as to avoid interfering projection.

From the foregoing description, taken in connection with the accompanying drawings, the construction and mode of operation of the device will be readily understood, and it will be seen that a marking attachment is provided which may be readily applied to any plow and used to accurately mark the distance between rows on either the landside or shareside of the plow.

Having thus described the invention, what is claimed as new is—

A marking attachment for plows comprising a bracket having means of attachment to a plow-beam, a bar pivotally connected with the bracket to be swung to project beyond either side of the beam, means for staying the bar in either of its operative positions, a holder slidably mounted upon the bar and having a vertical passage, means for securing said holder in adjusted position to the bar, a stem slidably mounted in said vertical passage and provided at its upper and lower ends with pivoted marking-fingers, whereby the stem may be adjusted in one direction or the other to bring the pivoted end of either marking-finger into the passage to make said finger rigid with the holder, and means upon the holder for fastening the stem thereto, substantially as described.

In testimony whereof I affix my signature in presence of two witnesses.

WILLIAM HENRY SUTTON.

Witnesses:
W. D. SUGGS,
H. F. LAWS.